United States Patent
Kim et al.

(10) Patent No.: US 7,632,554 B2
(45) Date of Patent: Dec. 15, 2009

(54) WALLPAPER HAVING THERMOCHROMIC MATERIAL LAYER AND MANUFACTURING METHOD THEREOF

(75) Inventors: Wan Soo Kim, Anyang-si (KR); Sung Il Woo, Busan (KR); Si Jae Kim, Busan (KR); Jong Heon Lee, Yangjoo-si (KR); Jae Woo Yang, Daejun (KR)

(73) Assignee: Dong-A University Research Foundation for Industry-Academy Cooperation, Busan (KR)

( * ) Notice: Subject to any disclaimer, the term of this patent is extended or adjusted under 35 U.S.C. 154(b) by 427 days.

(21) Appl. No.: 11/428,766

(22) Filed: Jul. 5, 2006

(65) Prior Publication Data

US 2007/0238614 A1 Oct. 11, 2007

(30) Foreign Application Priority Data

Apr. 7, 2006 (KR) .................. 10-2006-0031708
May 4, 2006 (KR) .................. 10-2006-0040294

(51) Int. Cl.
B41M 5/26 (2006.01)
B41M 5/28 (2006.01)
B41M 5/34 (2006.01)

(52) U.S. Cl. .................. 428/29; 427/150; 427/152; 428/1.1; 428/195.1; 428/913; 503/200

(58) Field of Classification Search .................. None
See application file for complete search history.

(56) References Cited

U.S. PATENT DOCUMENTS 6,382,125 B1 * 5/2002 Tamura .................. 116/207
7,220,761 B2 * 5/2007 Klein et al. .................. 514/318

FOREIGN PATENT DOCUMENTS

| KR | 1020010073804 | 8/2001 |
| KR | 100461659 | 12/2004 |
| KR | 20-0387414 | 6/2005 |
| WO | WO 2005/086128 | * 9/2005 |

* cited by examiner

Primary Examiner—Bruce H Hess
(74) Attorney, Agent, or Firm—Lowe Hauptman Ham & Berner, LLP

(57) ABSTRACT

A wallpaper having a thermochromic material layer and a manufacturing method thereof are disclosed where colors of a wallpaper having a thermochromic material layer change by a surrounding or human body temperature so information concerning surrounding temperature or human body health state is provided, and a user does not feel tedious about colors of a wallpaper. The manufacturing method of a wallpaper having a thermochromic material layer comprises forming a wallpaper substrate; forming at least one plane heater on the wallpaper substrate; forming at least one thermochromic material layer on the wallpaper substrate or the plane heater; forming at least one protection layer on the wallpaper substrate so that the thermochromic material layer and the plane heater are substantially covered; and forming a power supply and control means on the wallpaper substrate for supplying power to the plane heater and controlling temperature.

22 Claims, 8 Drawing Sheets

WALLPAPER HAVING THERMOCHROMIC MATERIAL LAYER AND MANUFACTURING METHOD THEREOF

TECHNICAL FIELD

The present invention relates to a wallpaper and a manufacturing method of the same, and in particular to a wallpaper having a thermochromic material layer and a manufacturing method thereof in which the colors of a wallpaper having a thermochromic material layer change in accordance with a surrounding or a human body temperature, so that an information concerning a surrounding temperature or a human body health state is provided, and a user does not feel tedious about the colors of a wallpaper. In addition, a wallpaper user can variously change the colors of a pattern or a character formed at a wallpaper in accordance with the seasons, time or temperatures.

BACKGROUND ART

Generally, a wallpaper is used for covering a concrete surface of an initial state building while preventing a building user and life items from being directly contacted with a concrete surface.

The wallpaper is formed of a wallpaper substrate printed with various graphics or images. The conventional wallpaper is designed to express graphics or images on an original paper surface for thereby allowing an indoor interior to look good or achieving a good quality indoor interior of a building. In the conventional art, the expressed graphics or images have the same colors, so that a user may feel tedious. In the case that wallpapers are changed every season, the cost disadvantageously increases.

To overcome the above problems, the Korean patent registration number 0355105 discloses a wallpaper in which a resin is coated on a surface of an original paper, and various patterns are printed on the resin. Flower patterns formed of stems, leaves, and petals using liquid paints are stacked on the surface of the resin, with the paints being provided in leaves and petals so that the colors change in accordance with temperatures.

In the above patent, the graphics or images formed on the wallpaper covered on a surface of an indoor wall are provided with paints of which the covers change in accordance with temperatures, so that the colors of the graphics or images provided with paints change in accordance with the changes of indoor temperatures. The above conventional wallpaper can variously change the outer look of the indoor in accordance with the changing indoor temperatures, so that a user can easily recognize the indoor temperature.

The conventional wallpaper contains paints of which the colors change in accordance with surrounding temperatures, but it does not more effectively work in the indoor in which temperature changes are less. So, the conventional wallpaper always has the same colors since the indoor temperatures do not change greatly. The consumer may not feel any color differences as compared to the conventional wallpapers though its price is high.

In the conventional wallpaper, the colors change only based on the surrounding temperature, so that the user cannot manually change the colors of the wallpapers when he needs to change it.

The technology for changing printed patterns or shapes based on the changes of temperatures will be described.

The Korean patent registration number 0461659 discloses a PVC floor material formed of multiple layers in which various patterns are printed on a corresponding printing layer using inks based on Gravure printing method or transfer printing method, with the inks being made by mixing 0.1~5 parts by weight of organic type micro capsule thermochromic paint having 3~10 μm diameter, 10~20 parts by weight of polyvinyl alcohol resin and 80~85 parts by weight. Since the PVC floor material is patterned with ink containing thermochromic paints, the printed patterns appear or disappear based on the changes of temperatures for thereby achieving a unique look.

However, the colors of the conventional PVC floor material change only based on the surrounding temperatures, so that a user cannot manually change the colors of the PVC floor material when he needs to change it.

According to the Korean utility model registration number 0387414, a poikilothermal thermochromic micron powder is master-batched on a transparent plastic pellet for thereby manufacturing a poikilothermal plastic pellet, and it is poured into a hopper of an extrusion molding device for thereby manufacturing a poikilothermal plastic seat. A coating liquid mixed with a nano-photochromic capsulation paint and a chromic paint is coated on an upper surface of the poikilothermal plastic seat and is exposed to sunshine (ultraviolet ray). With the above processes, a light and temperature-based discoloration chromic plastic seat is manufactured, so that the colors of the seat change in accordance with the changes of temperature. In the light and temperature-based discoloration chromic plastic seat, when a transparent and semi-transparent color plastic seat is exposed to sunshine (ultraviolet ray), it changes to a certain color. When it is not exposed to sunshine, the colors turns to its original color. It may be changed to a certain color based on the changes of temperatures.

However, in the above-described light and temperature-based discoloration chromic plastic seat, the colors change only based on the surrounding temperatures. Namely, a user cannot manually change the colors when he needs to change it.

DISCLOSURE OF THE INVENTION

Accordingly, it is an object of the present invention to provide a wallpaper having a thermochromic material layer and a manufacturing method thereof which overcome the problems encountered in the conventional art.

It is another object of the present invention to provide a wallpaper having a thermochromic material layer and a manufacturing method thereof which are capable of providing information concerning a surrounding temperature and human body health state by providing a wallpaper of which the colors change based on the changes of a surrounding or human body temperature.

It is further another object of the present invention to provide a wall paper having a thermochromic material layer and a manufacturing method thereof in which a plane heater is provided in a wallpaper having a thermochromic material layer of which the colors change in accordance with temperature, with the plane heater being designed to control a thermochromic material layer.

To achieve the above objects, there is provided a method for manufacturing a wallpaper which comprises a step in which a wallpaper substrate is formed; a step in which a thermochromic material layer is formed on the wallpaper substrate; and a step in which a protection layer is formed on the thermochromic material layer.

In a method for manufacturing a wallpaper, there is provided a manufacturing method of a wallpaper having a thermochromic material layer which comprises a step in which a wallpaper substrate is formed; a step in which at least one plane heater is formed on the wallpaper substrate; a step in which at least one thermochromic material layer is formed on the wallpaper substrate or the plane heater; a step in which at least one protection layer is formed on the wallpaper substrate so that the thermochromic material layer and the plane heater are substantially covered; and a step in which a power supply and control unit is formed on the wallpaper substrate for supplying power to the plane heater and controlling temperature.

The thermochromic material layer may be preferably formed of at least one layer selected among a liquid crystal layer, a cholesteric liquid crystal layer, a photo-crosslinkable polymer material layer, and a liquid crystal polymer material layer.

The thermochromic material layer is preferably made by using at least one material selected among a liquid crystal material, a cholesteric liquid crystal material, a photo-crosslinkable material and a liquid crystal polymer material.

There is further provided a step in which at least one indicator unit, of which the color changes in accordance with a surrounding or human body temperature change, is formed on the wallpaper substrate.

There are further provided a step in which a color indicator part, of which the colors change in accordance with a surrounding or human body temperature change, is formed on the indicator unit; and a step in which a description indicator part, which indicates information in accordance with a surrounding or human body temperature change, is formed on the indicator unit.

The wallpaper substrate is formed of a Korean traditional paper.

In a wallpaper, there is provided a wallpaper having a thermochromic material layer which comprises a wallpaper substrate; a thermochromic material layer which is formed on the wallpaper substrate; and a protection layer which is formed on the thermochromic material layer.

In a wallpaper, there is provided a wallpaper having a thermochromic material layer which comprises a wallpaper substrate; at least one plane heater which is formed on the wallpaper substrate; at least one thermochromic material layer which is formed on the wallpaper substrate or the plane heater; at least one protection layer which is formed on the wallpaper substrate so that the thermochromic material layer and the plane heater are substantially covered; and a power supply and control unit which is formed on the wallpaper substrate for supplying power to the plane heater and controlling temperature.

The thermochromic material layer may be preferably formed of at least one layer selected among a liquid crystal layer, a cholesteric liquid crystal layer, a photo-crosslinkable polymer material layer, and a liquid crystal polymer material layer.

The thermochromic material layer is preferably made by using at least one material selected among a liquid crystal material, a cholesteric liquid crystal material, a photo-crosslinkable material and a liquid crystal polymer material.

There is further provided at least one indicator unit, of which the color changes in accordance with a surrounding or human body temperature change, formed on the wallpaper substrate.

There are further provided a color indicator part, of which the colors change in accordance with a surrounding or human body temperature change, formed on the indicator unit; and a description indicator part which indicates information in accordance with a surrounding or human body temperature change and is formed on the indicator unit.

The wallpaper substrate is formed of a Korean traditional paper.

BRIEF DESCRIPTION OF THE DRAWINGS

The present invention will become better understood with reference to the accompanying drawings which are given only by way of illustration and thus are not limitative of the present invention, wherein.

MODES FOR CARRYING OUT THE INVENTION

The preferred embodiments of the present invention will be described with reference to the accompanying drawings.

First Embodiment

Figure 1A:
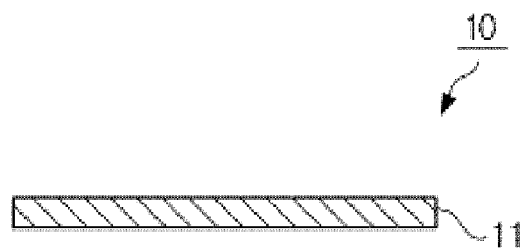
FIGS. 1A through 1C are cross sectional views illustrating a manufacturing process of a wallpaper having a thermochromic material layer according to a first embodiment of the present invention.
Figure 1B:
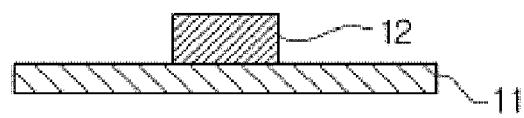
Figure 1C:
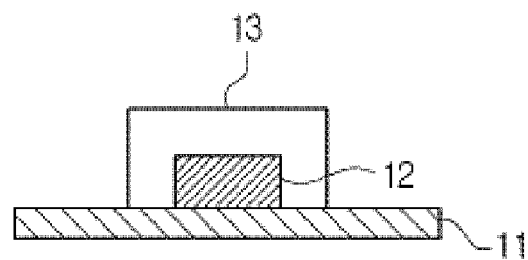

FIGS. 1A through 1C are cross sectional views illustrating a manufacturing process of a wallpaper having a thermochromic material layer according to a first embodiment of the present invention.

As shown in FIG. 1C, a wallpaper 10 according to a first embodiment according to the present invention comprises a wallpaper substrate 11, a thermochromic material layer 12 formed on the wallpaper substrate 11, and a protection layer 13 formed on the thermochromic material layer 12.

The method for manufacturing a wallpaper according to a first embodiment of the present invention will be described with reference to FIGS. 1A through 1C.

As shown in FIG. 1A, a wallpaper substrate 11 is formed.

As shown in FIG. 1B, a thermochromic material layer 12 is formed on the wallpaper substrate 11.

As shown in FIG. 1C, a protection layer 13 is formed on the wallpaper substrate 11 so that the thermochromic material layer 12 is substantially covered.

Here, the thermochromic material layer 12 may be preferably formed of at least one layer selected among a liquid crystal layer, a cholesteric liquid crystal layer, a photo-crosslinkable polymer material layer, and a liquid crystal polymer material layer. The thermochromic material layer 12 is preferably made by using at least one material selected among a liquid crystal material, a cholesteric liquid crystal material, a photo-crosslinkable material and a liquid crystal polymer material.

Second Embodiment

Figure 2:
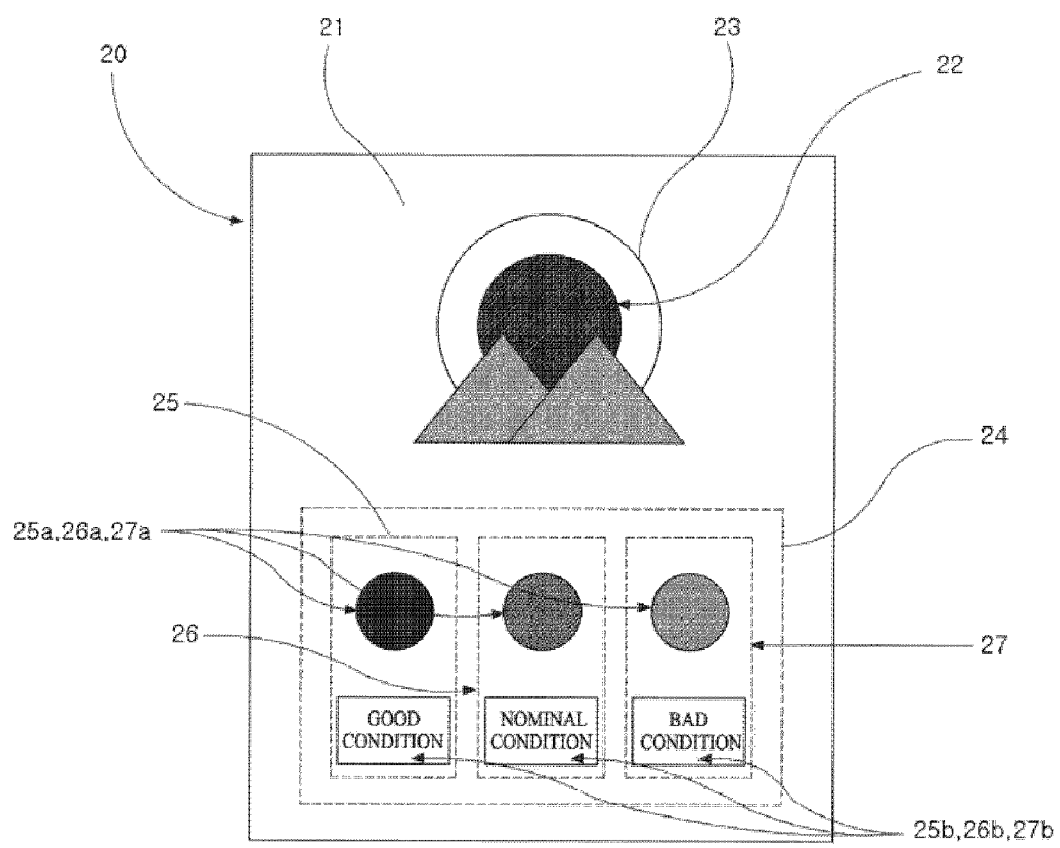
FIG. 2 is a plane view illustrating a wallpaper having a thermochromic material layer according to a second embodiment of the present invention.

FIG. 2 is a plane view illustrating a wallpaper having a thermochromic material layer according to a second embodiment of the present invention while illustrating a wallpaper which provides an information concerning a surrounding temperature state.

As shown in FIG. 2, in the wallpaper 20 according to a second embodiment of the present invention, a thermochromic material layer 22 is formed on a wallpaper substrate 21. A protection layer 23 is formed on the thermochromic material layer 22. At least one indicator unit 24, of which the colors change in accordance with a surrounding temperature change, is formed on the wallpaper substrate 21. Here, the indicator part 24 comprises a plurality of color indicator parts 25a, 26a and 27a of which the colors change in accordance with a surrounding temperature change, and a plurality of description indicator parts 25b, 26b and 27b which indicate information in accordance with a surrounding temperature change. Here, the color indicator parts 25a, 26a and 27a and the description indicator parts 25b, 26b and 27b are formed of the same thermochromic material layers as the thermochromic material layer 22.

Here, in the same manner as the first embodiment of the present invention, the thermochromic material layer 22 may be preferably formed of at least one layer selected among a liquid crystal layer, a cholesteric liquid crystal layer, a photo-crosslinkable polymer material layer, and a liquid crystal polymer material layer. The thermochromic material layer is preferably made by using at least one material selected among a liquid crystal material, a cholesteric liquid crystal material, a photo-crosslinkable material and a liquid crystal polymer material.

In the thermochromic material layer 22, a molecular arrangement structure of the thermochromic material layer 22 changes in accordance with a surrounding temperature. A wavelength distribution of light changes, so that a certain change occurs in the color when a user sees the colors, with the light being selectively reflected based on the change of the molecular arrangement structure. In this case, the user can recognize information concerning a surrounding temperature through the indicator unit 24 formed on the wallpaper 21. Namely, the user can recognize information concerning a surrounding temperature based on the colors and descriptions of the color indicator parts 25a, 26a and 27a and the description indicator parts 25b, 26b and 27b.

So, the wallpaper 20 according to the second embodiment of the present invention is capable of providing information in accordance with a surrounding temperature change through the thermochromic material layer 22, the color indicator parts 25a, 26a and 27a formed of thermochromic material layers, and the description indicator parts 25b, 26b and 27b.

Third Embodiment

Figure 3:
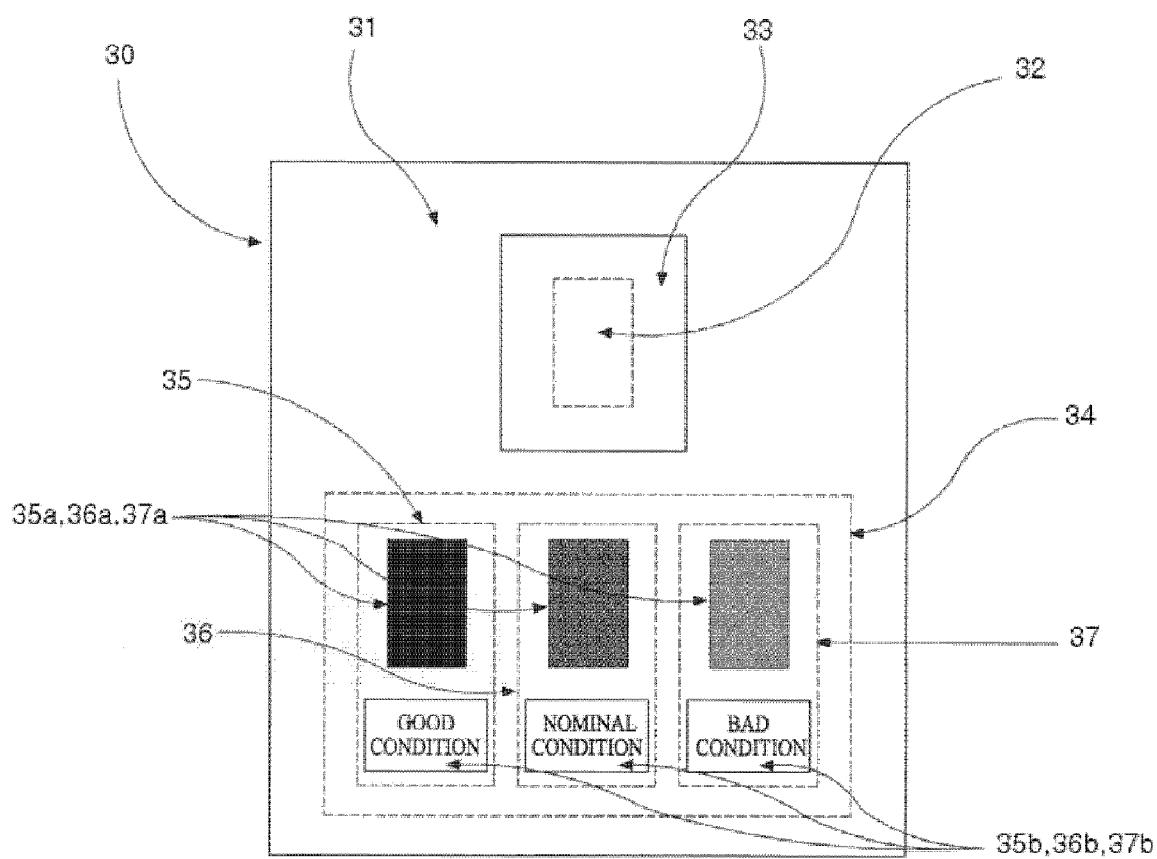
FIG. 3 is a plane view illustrating a wallpaper having a thermochromic material layer according to a third embodiment of the present invention.

FIG. 3 is a plane view illustrating a wallpaper having a thermochromic material layer according to a third embodiment of the present invention, while illustrating a wallpaper which provides information concerning a surrounding or human body temperature state.

As shown in FIG. 3, in the wallpaper 30 according to a third embodiment of the present invention, a thermochromic material layer 32 is formed on a wallpaper substrate 31, and a protection layer 33 is formed on the thermochromic material layer 32. At least one indicator unit 24 is provided on the wallpaper substrate 31, with a thermochromic change occurring at the indicator unit 24 in accordance with a surrounding or human body temperature change. The indicator unit 24 comprises a plurality of color indicator parts 35a, 36a and 37a of which the colors change in accordance with a surrounding or human body temperature change, and a plurality of description indicator parts 35b, 36b and 37b which indicate information in accordance with a surrounding or human body temperature change. Here, the color indicator parts 35a, 36a and 37a and the description indicator parts 35b, 36b and 37b are formed of the same thermochromic material layers as the thermochromic material layer 32.

In the same manner as the first and second embodiments of the present invention, the thermochromic material layer 32 may be preferably formed of at least one layer selected among a liquid crystal layer, a cholesteric liquid crystal layer, a photo-crosslinkable polymer material layer, and a liquid crystal polymer material layer. The thermochromic material layer is preferably made by using at least one material selected among a liquid crystal material, a cholesteric liquid crystal material, a photo-crosslinkable material and a liquid crystal polymer material.

When a user touches the thermochromic material layer 32 with his finger, the color of the thermochromic material layer 32 changes in accordance with a body temperature. Here, the color of the thermochromic material layer 32 changes because the wavelength distribution of light changes as a molecular arrangement structure changes in accordance with a human body temperature. In this case, the user can recognize information concerning a human body temperature or health state through the indicator unit 34 provided on the wallpaper 31. Namely, the user can recognize a human body temperature or health state based on the colors and descriptions which are provided in the color indicator parts 35a, 36a and 37a and the description indicator parts 35b, 36b and 37b.

The wallpaper 30 according to a third embodiment of the present invention provides a function for indicating information in accordance with a surrounding or human body temperature through the thermochromic material layer 32, the color indicator parts 35a, 36a and 37a formed of thermochromic material layers, and the description indicator parts 35b, 36b and 37b.

Fourth Embodiment

Figure 4:
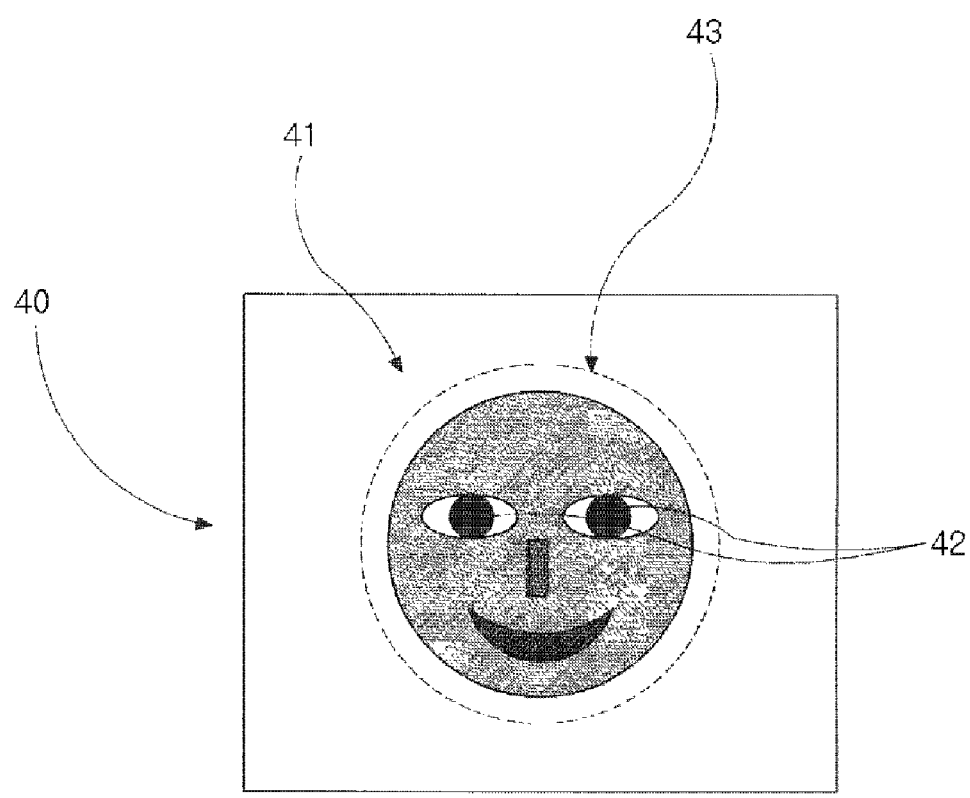
FIG. 4 is a plane view illustrating a wallpaper having a thermochromic material layer according to a fourth embodiment of the present invention.

FIG. 4 is a plane view illustrating a wallpaper having a thermochromic material layer according to a fourth embodiment of the present invention, while illustrating a certain shaped wallpaper of which the color changes in accordance with a surrounding temperature.

As shown in FIG. 4, in the wallpaper 40 according to a fourth embodiment of the present invention, a certain shaping part 43 is formed on a wallpaper substrate 41, and a thermochromic material layer 42 is formed on the shaping part 43 in accordance with a surrounding or human body temperature change. A protection layer (not shown) is formed on the thermochromic material layer 42.

In the same manner as the first through third embodiments of the present invention, the thermochromic material layer 42 may be preferably formed of at least one layer selected among a liquid crystal layer, a cholesteric liquid crystal layer, a photo-crosslinkable polymer material layer, and a liquid crystal polymer material layer. The thermochromic material layer is preferably made by using at least one material selected among a liquid crystal material, a cholesteric liquid crystal material, a photo-crosslinkable material and a liquid crystal polymer material.

With the above methods, the wallpaper may be formed in a certain construction or shape. A certain information concerning a surrounding temperature or human body health state can be provided by changing the colors in accordance with a surrounding or human body temperature change.

Fifth Embodiment

Figure 5A:
FIGS. 5A through 5E are cross sectional views illustrating a manufacturing process of a wallpaper having a thermochromic material layer according to a fifth embodiment of the present invention.
Figure 5B:
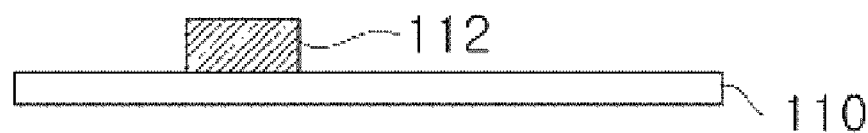
Figure 5C:
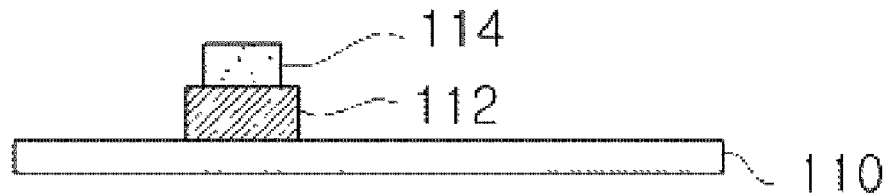
Figure 5D:
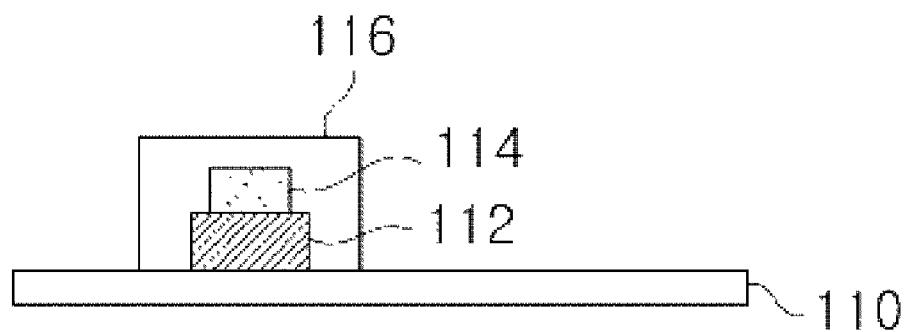
Figure 5E:
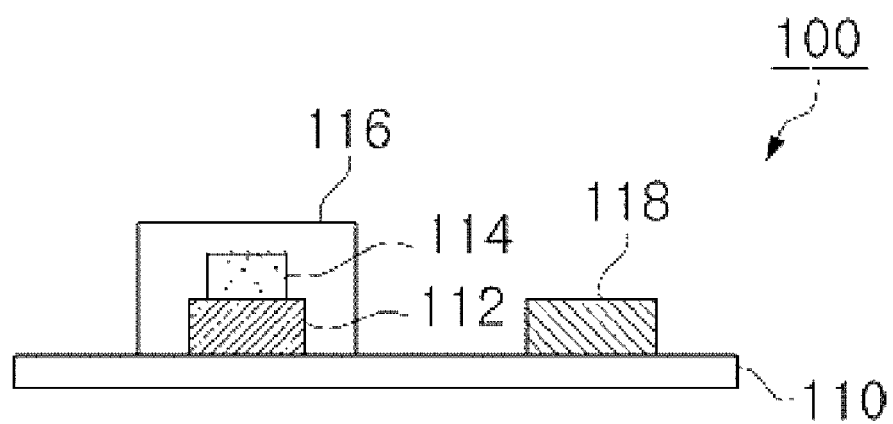
Figure 6:
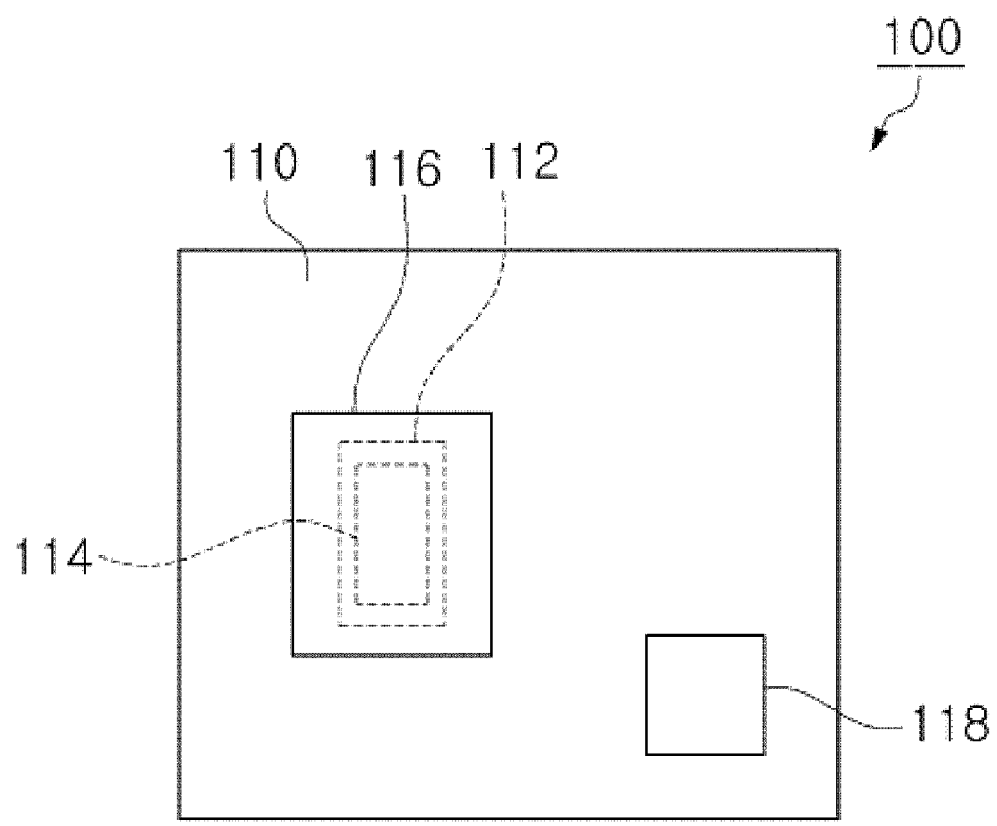
FIG. 6 is a plane view of FIG. 5E.

FIGS. 5A through 5E are cross sectional views illustrating a manufacturing process of a wallpaper having a thermochromic material layer according to a fifth embodiment of the present invention, and FIG. 6 is a plane view of FIG. 5E.

As shown in FIG. 5E, a wallpaper 100 having a thermochromic material layer according to a fifth embodiment of the present invention comprises a wallpaper substrate 110, at least one plane heater 112 formed on the substrate 110, at least one thermochromic material layer 114 formed on the substrate 110 or the plane heater 112, at least one protection layer 116 formed on the substrate 110 so that the thermochromic material layer 114 and the plane heater 112 are substantially covered, and a power supply and control unit 118 which is provided on the substrate 110 for supplying power to the plane heater 112 and controlling temperature.

The manufacturing method of a wallpaper having a thermochromic material layer according to the present invention will be described with reference to FIGS. 5A through 5E.

As shown in FIGS. 5A through 5E, a wallpaper substrate 110 is formed, and at least one plane heater 112 is formed on the substrate 110.

As shown in FIG. 5C, at least one thermochromic material layer 114 is formed on the plane heater 112. Here, though it is not shown in the drawings, the thermochromic material layer 114 may be formed on the wallpaper substrate 110.

As shown in FIG. 5D, a protection layer 116 is formed on the wallpaper substrate 110 so that the thermochromic material layer 114 and the plane heater 112 are substantially covered.

Finally, as shown in FIG. 5E, a power supply and control unit 118 is provided on the wallpaper substrate 110 for supplying power to the plane heater 112 and controlling temperature.

Here, the plane heater 112 is a heater for generating heat based on the power supply and control unit 118. For example, an electric energy is converted into a heat energy using a heating member of a ceramic resistance member having a certain electric resistance. The plane heater 112 having the above function is implemented using a metallic film, a heating paint (carbon black) or a carbon fiber.

An insulation layer (not shown) is provided for insulation between the substrate 110 and the plane heater 112.

In the same manner as the first through fourth embodiments of the present invention, the thermochromic material layer 114 may be preferably formed of at least one layer selected among a liquid crystal layer, a cholesteric liquid crystal layer, a photo-crosslinkable polymer material layer, and a liquid crystal polymer material layer. The thermochromic material layer is preferably made by using at least one material selected among a liquid crystal material, a cholesteric liquid crystal material, a photo-crosslinkable material and a liquid crystal polymer material.

Here, the wallpaper substrate 110 may be made using a Korean traditional paper.

Sixth Embodiment

Figure 7A:
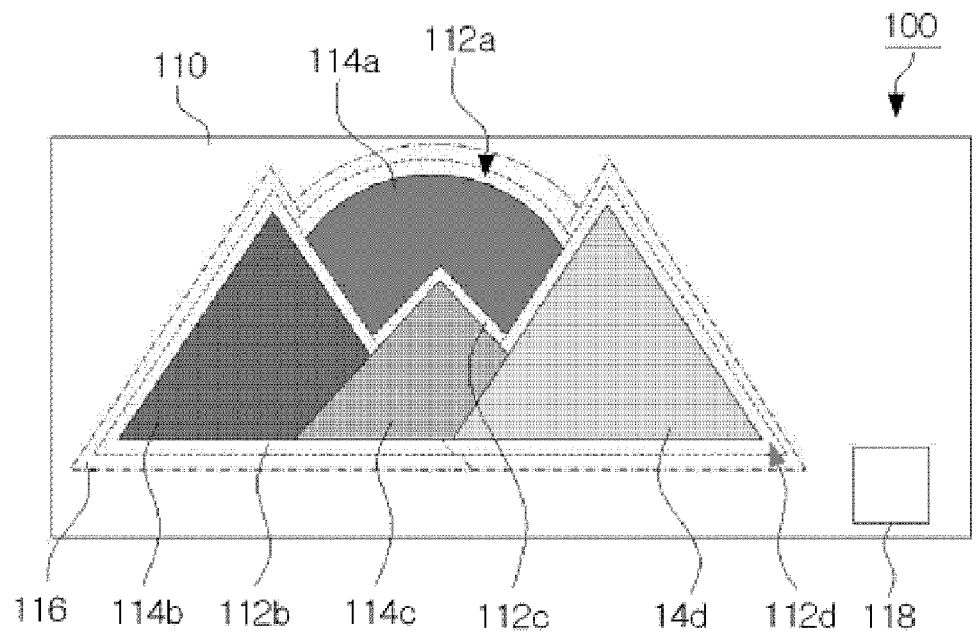
FIGS. 7A and 7B are views illustrating first and second operation states of a wallpaper having a thermochromic material layer according to a sixth embodiment of the present invention.
Figure 7B:
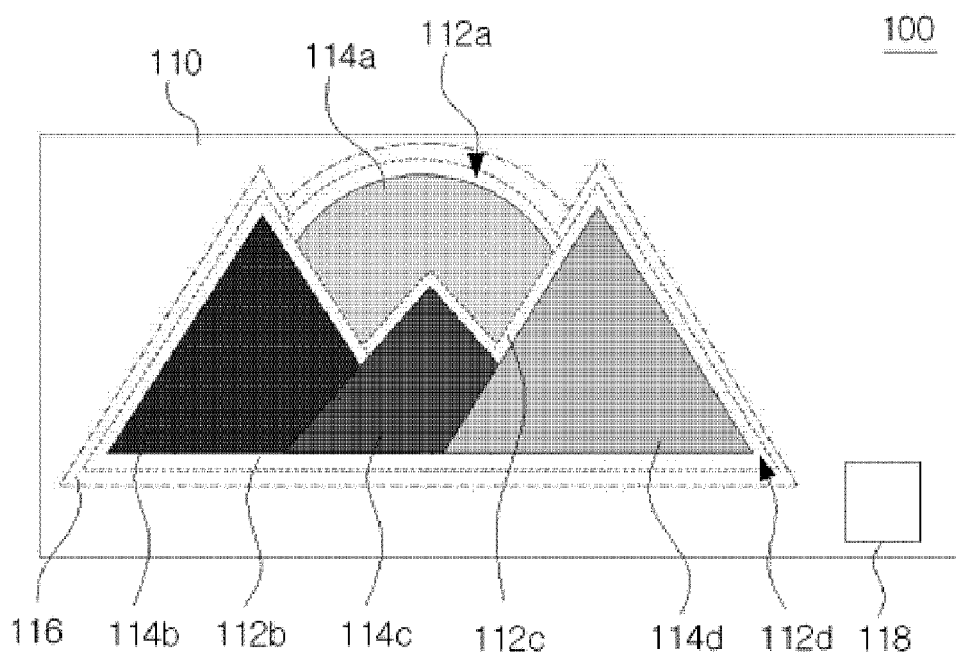

FIGS. 7A and 7B are views illustrating first and second operation states of a wallpaper having a thermochromic material layer according to a sixth embodiment of the present invention. Here, FIG. 7A represents a first time period (for example, day time period) or a first operation state of a wallpaper in a first temperature state, and FIG. 7B represents a second time period or a second operation state of a wallpaper in a second temperature state.

As shown in FIG. 7A and FIG. 7B, the wallpaper having a thermochromic material layer according to a sixth embodiment of the present invention comprises a wallpaper substrate 110, first through fourth plane heaters 112a through 112b formed on the wallpaper substrate 110, first through fourth thermochromic material layers 114a through 114d formed on the plane heaters 112a through 112d, a protection layer 116 formed on the wallpaper substrate 110 so that the first through fourth thermochromic material layers 114a through 114d and the first through fourth plane heaters 112a through 112d are substantially covered, and a power supply and control unit 118 for supplying power to the first through fourth plane heaters 112a through 112d and controlling temperatures, respectively.

In the same manner as the first through fifth embodiments of the present invention, the thermochromic material layers 114a through 114d may be preferably formed of at least one layer selected among a liquid crystal layer, a cholesteric liquid crystal layer, a photo-crosslinkable polymer material layer, and a liquid crystal polymer material layer. The thermochromic material layers are preferably made by using at least one material selected among a liquid crystal material, a cholesteric liquid crystal material, a photo-crosslinkable material and a liquid crystal polymer material.

In the first through fourth plane heaters 112a through 112d, the power supply and control unit 118 supplies power and controls temperatures. In the first through fourth plane heaters 112a through 112d, the colors change based on the temperatures of the first through fourth plane heaters 112a through 112d.

As shown in FIGS. 7A through 7B, when the temperatures of the first through plane heaters 112a through 112d are differently controlled during the day time period and night time period, the colors of the first through fourth thermochromic materials 114a through 114d may be differently changed.

For the same operation and effects as the above, one layer selected among a liquid crystal layer, a cholesteric liquid crystal layer, a photo-crosslinkable polymer material layer, and a liquid crystal polymer material layer may be used instead of the first through fourth thermochromic material layers 114a through 114d.

As described above, in a wallpaper having a thermochromic material layer and a manufacturing method thereof according to the present invention, there is provided a wallpaper of which the colors change in accordance with a surrounding or human body temperature change, and information concerning a surrounding temperature or human body health state can be provided. A user of a wallpaper according to the present invention does not feel tedious.

In addition, it is possible to control a thermochromic material layer (liquid crystal layer), of which the colors change in accordance with temperatures, by controlling a plane heater provided in wallpaper. Since a wallpaper user can variously change the colors of a pattern or a character formed on a wallpaper based on the seasons, time or temperatures, it is possible to variously change an indoor interior.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A method of manufacturing a wallpaper, comprising:
   a step in which a wallpaper substrate is formed;
   a step in which a thermochromic material layer is formed on the wallpaper substrate;
   a step in which a plane heater with a heating member having a ceramic resistance member is formed on at least one of the wallpaper substrate or the thermochromic material layer, wherein the plane heater is controllable so as to change a temperature of the thermochromic material layer; and
   a step in which a protection layer is formed on at least one of the thermochromic material layer or the plane heater.

2. The method of claim 1, wherein said thermochromic material layer may be formed from at least one selected from the group consisting of a liquid crystal layer, a cholesteric liquid crystal layer, a photo-crosslinkable polymer material layer, and a liquid crystal polymer material layer.

3. The method of claim 1, wherein said thermochromic material layer is made of at least one selected from the group consisting of a liquid crystal material, a cholesteric liquid crystal material, a photo-crosslinkable material and a liquid crystal polymer material.

4. The method of claim 1, further comprising a step in which at least one indicator unit, of which a color changes in accordance with a surrounding or human body temperature change, is formed on the wallpaper substrate.

5. The method of claim 1, wherein said wallpaper substrate is formed of Korean traditional paper.

6. In a method of manufacturing a wallpaper, a manufacturing method of a wallpaper having a thermochromic material layer, comprising:
   a step in which a wallpaper substrate is formed;
   a step in which at least one plane heater with a heating member having a ceramic resistance member is formed on the wallpaper substrate;
   a step in which at least one thermochromic material layer is formed on the wallpaper substrate or the plane heater;
   a step in which at least one protection layer is formed on the wallpaper substrate so that the thermochromic material layer and the plane heater are substantially covered; and
   a step in which a power supply and control means is formed on the wallpaper substrate for supplying power to the plane heater and controlling a temperature.

7. The method of claim 6, wherein said thermochromic material layer may be formed from at least one selected from the group consisting of a liquid crystal layer, a cholesteric liquid crystal layer, a photo-crosslinkable polymer material layer, and a liquid crystal polymer material layer.

8. The method of claim 6, wherein said thermochromic material layer is made of at least one selected from the group consisting of a liquid crystal material, a cholesteric liquid crystal material, a photo-crosslinkable material and a liquid crystal polymer material.

9. The method of claim 6, further comprising a step in which at least one indicator unit, of which a color changes in accordance with a surrounding or human body temperature change, is formed on the wallpaper substrate.

10. The method of claim 9, further comprising:
    a step in which a color indicator part, of which the color changes in accordance with the surrounding or human body temperature change, is formed on the indicator unit; and
    a step in which a description indicator part, which indicates information in accordance with the surrounding or human body temperature change, is formed on the indicator unit.

11. The method of claim 6, wherein said wallpaper substrate is formed of Korean traditional paper.

12. In a wallpaper, a wallpaper having a thermochromic material layer, comprising:
    a wallpaper substrate;
    a thermochromic material layer which is formed on the wallpaper substrate;
    a plane heater with a heating member having a ceramic resistance member formed on at least one of the wallpaper substrate or the thermochromic material layer, wherein the plane heater is controllable so as to change a temperature of the thermochromic material layer; and
    a protection layer which is formed on at least one of the thermochromic material layer or the plane heater.

13. The wallpaper of claim 12, wherein said thermochromic material layer may be formed from at least one selected from the group consisting of a liquid crystal layer, a cholesteric liquid crystal layer, a photo-crosslinkable polymer material layer, and a liquid crystal polymer material layer.

14. The wallpaper of claim 12, wherein said thermochromic material layer is made of at least one selected from the group consisting of a liquid crystal material, a cholesteric liquid crystal material, a photo-crosslinkable material and a liquid crystal polymer material.

15. The wallpaper of claim 12, further comprising at least one indicator unit, of which a color changes in accordance with a surrounding or human body temperature change, formed on the wallpaper substrate.

16. The wallpaper of claim 12, wherein said wallpaper substrate is formed of Korean traditional paper.

17. In a wallpaper, a wallpaper having a thermochromic material layer, comprising:
    a wallpaper substrate;
    at least one plane heater with a heating member having a ceramic resistance member which is formed on the wallpaper substrate;
    at least one thermochromic material layer which is formed on the wallpaper substrate or the plane heater;
    at least one protection layer which is formed on the wallpaper substrate so that the thermochromic material layer and the plane heater are substantially covered; and
    a power supply and control means which is formed on the wallpaper substrate for supplying power to the plane heater and controlling a temperature.

18. The wallpaper of claim 17, wherein said thermochromic material layer may be formed from at least one selected from the group consisting of a liquid crystal layer, a cholesteric liquid crystal layer, a photo-crosslinkable polymer material layer, and a liquid crystal polymer material layer.

19. The wallpaper of claim 17, wherein said thermochromic material layer is made of at least one selected from the group consisting of a liquid crystal material, a cholesteric liquid crystal material, a photo-crosslinkable material and a liquid crystal polymer material.

20. The wallpaper of claim 17, further comprising at least one indicator unit, of which a color changes in accordance with a surrounding or human body temperature change, formed on the wallpaper substrate.

21. The wallpaper of claim 20, further comprising:
a color indicator part, of which colors change in accordance with the surrounding or human body temperature change, formed on the indicator unit; and
a description indicator part which indicates information in accordance with the surrounding or human body temperature change and is formed on the indicator unit.

22. The wallpaper of claim 17, wherein said wallpaper substrate is formed of Korean traditional paper.

* * * * *